United States Patent [19]
Gold

[11] 3,866,958
[45] Feb. 18, 1975

[54] FLUID TIGHT CONDUIT FASTENING SYSTEM

[76] Inventor: Harold Gold, 3645 Tolland Rd., Shaker Heights, Ohio 44122

[22] Filed: July 13, 1973

[21] Appl. No.: 379,199

[60] Division of Ser. No. 124,741, Mar. 16, 1971, Pat. No. 3,746,376.

[52] U.S. Cl. .......................... 285/334.2, 285/382.7
[51] Int. Cl. ............................................. F16l 19/00
[58] Field of Search .............. 285/334.1, 334.2, 341, 285/342, 343, 353, 370, 371, 379, 382, 7, 397, 398, DIG. 22

[56] References Cited
UNITED STATES PATENTS

| | | | |
|---|---|---|---|
| 1,672,879 | 6/1928 | Campbell | 285/334.1 X |
| 2,139,413 | 12/1938 | Kreidel | 285/382.7 X |
| 3,338,598 | 8/1967 | Kurtz | 285/334.2 X |
| 3,676,573 | 7/1972 | Avery | 285/382.7 X |

*Primary Examiner*—Paul R. Gilliam
*Assistant Examiner*—David H. Corbin

[57] ABSTRACT

This invention provides a fluid tight conduit union that utilizes a two piece coupling mechanism such as a screw and nut. The coupling mechanism clamps a separate seat insert which is attached to a member of the union assembly by a simple latching mechanism. The latching mechanism maintains positive attachment of the seat insert to a member of the union assembly when the coupling halves are separated.

3 Claims, 11 Drawing Figures

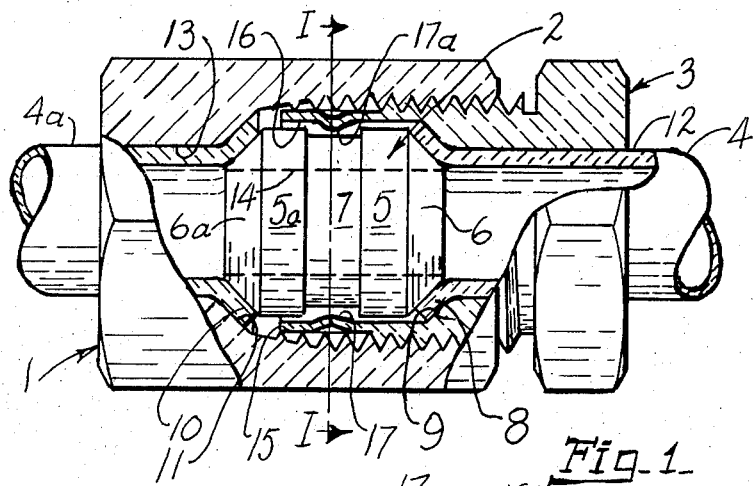
Fig_1_
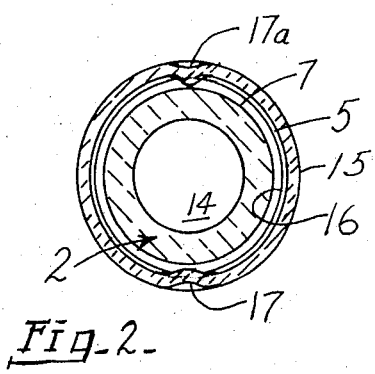
Fig_2_
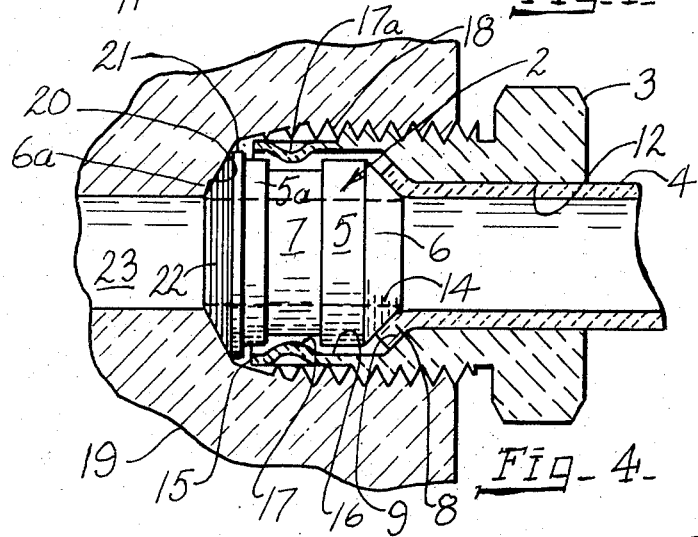
Fig_4_
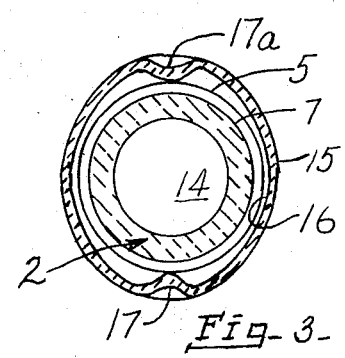
Fig_3_
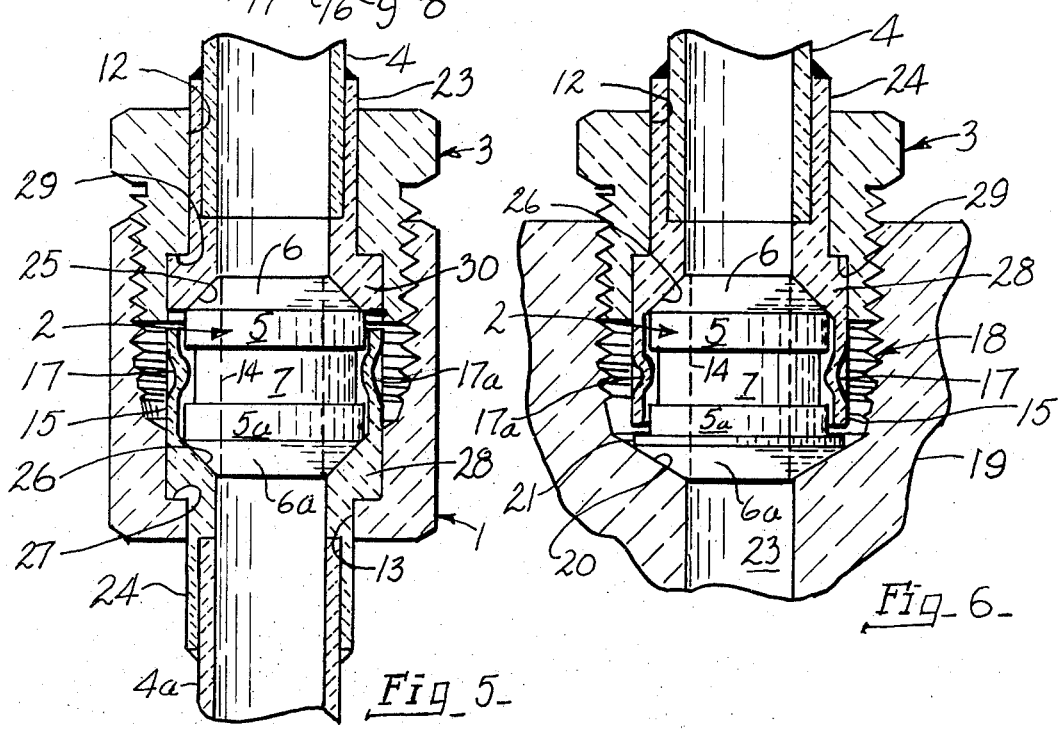
Fig_5_  Fig_6_

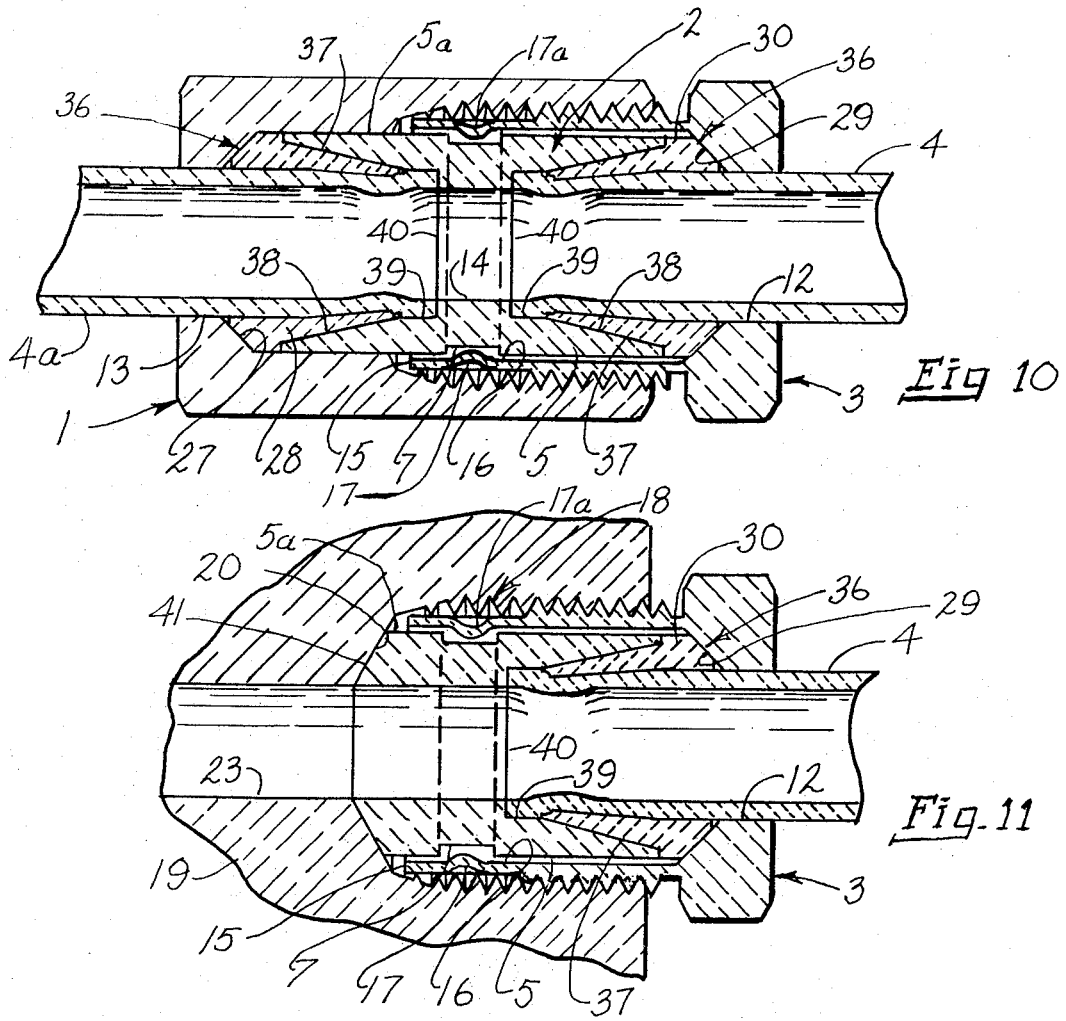
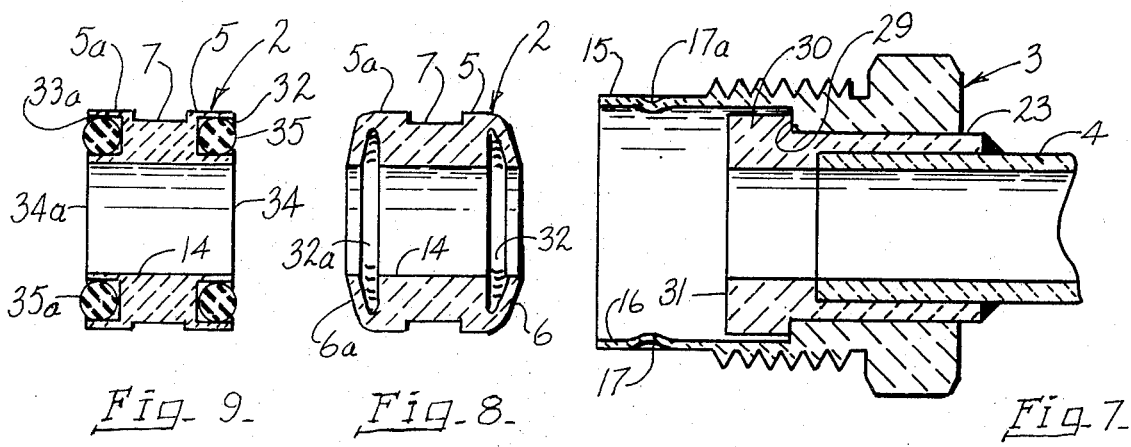

FLUID TIGHT CONDUIT FASTENING SYSTEM

BACKGROUND OF THE INVENTION

1. Field of the Invention

This invention relates to pipe and tube unions and more particularly to the type that utilize a separate seat insert.

2. The Prior Art

Pipe unions for coupling coaxial pipes characteristicly employ a bored screw and an internally shouldered nut that draw a seal face on the end of the screw and on a flange insert in the nut into sealing contact; and, tube unions for coupling coaxial tubes characteristicly employ two bored screws and two shouldered nuts that separately draw each of two flanged tube ends into sealing contact with the screw ends. The obviously simpler configuration of the pipe union has not been broadly applied to tubing primarily because it has not been practical to join thin walled or soft tubing to the screw or the flange insert of the union by threading.

A method for coaxially coupling two flair-flanged tubes that employs only one bored screw and shouldered nut was disclosed by Wenk in U.S. Pat. No. 2,399,275. In Wenk's fitting, a seat insert having opposite, convex, conical end faces is clamped between the flared ends of the tubes being joined. This arrangement permits one bored screw and shouldered nut to simultaneously clamp both pairs of sealing faces.

The separate seat insert, such as disclosed by Wenk is a functionally valid concept, but because the seat insert is held in assembly position by clamping action only, the seat insert can fall away upon disassembly and can fall away or cock upon assembly. This assembly and disassembly difficulty, which is magnified when the fitting is in an awkward position, has severly limited the use of the concept. The assembly problem is solved in the present invention through the provision of means whereby the seat insert is attached to a component of the union along with one tube end prior to assembly of the union and remains so attached upon separation of the union halves.

A prior art that relates to an embodiment of the present invention is the SAE seat insert type of inverted flare fitting. The SAE fitting employs a seat insert having opposite, convex, conical end faces, the cone angle of one face matching the angle of a drill, the seat insert being clamped between the flared end of a tube and the shouldered bottom of a tap-drilled hole. The SAE seat insert provides a coaxial, cylindrical projection that is intended to be secured in a counterbore at the bottom of the tap-drilled hole; but this method of seat insert attachment is subject to failure because the required dimensional control for a press-fit attachment cannot be economically maintained in production. Current SAE specifications permit a 0.002 inch loose fit. The seat attachment method of the present invention does not require dimensional control that is beyond the limits of economical production. This and other advantages over this prior art will be presented in the detailed description that is part of this specification.

SUMMARY OF THE INVENTION

The present invention provides a union coupling that may be employed in both piping and tubing systems. The union utilizes a single, two-piece coupling mechanism, such as a screw and nut, which clamps a separate seat insert. The seat insert has coaxial end faces that are simultaneously clamped against mating surfaces by the screw-nut mechanism. Means are provided to attach the seat insert to one of the mating surfaces prior to assembly of the union. The attachment mechanism permits both axial and lateral movement of the seat insert for self alignment in the tightened union assembly. The seat attachment mechanism prevents the falling away of the seat insert upon disassembly of the union and prevents the falling away or cocking of the seat insert during assembly in hard-to-get-at installations. The mechanism of the union is adaptable to flare type or other sealing face arrangements and to non-rotatable nut installations such as a tapped hole in a fixed body.

BRIEF DESCRIPTION OF THE DRAWINGS

FIG. 1 shows a view, partially in section, of an assembled union in accordance with this invention, adapted to join a pair of flared tubes;

FIG. 2 shows a cross-sectional view taken in the plane I—I identified in FIG. 1;

FIG. 3 shows a view as in FIG. 2 but with the parts in a partially engaged position;

FIG. 4 shows a cross-sectional view of an adaptation of the embodiment of FIG. 1 through which a flared tube is fastened to a tapped hole in a body;

FIG. 5 shows a cross-sectional view of an assembled union in accordance with this invention adapted to join a pair of tubes that are secured to flanged ends that have concave, conical seating surfaces;

FIG. 6 shows a cross-sectional view of an adaptation of the embodiment of FIG. 5 through which a tube that is secured to a flanged end is fastened in a tapped hole in a body;

FIG. 7 shows a cross-sectional view of a bored screw in accordance with this invention, adapted to couple a tube that is secured to a flange having a flat sealing face;

FIG. 8 shows a cross-sectional view of a seat insert in accordance with this invention, adapted to latch with the bored screw of FIG. 7 and to seal against flat faces;

FIG. 9 shows a cross-sectional view of a seat insert in accordance with this invention, adapted to latch with the bored screw of FIG. 7 and to hold gaskets for sealing against flat faces;

FIG. 10 shows a cross-sectional view of an assembled union in accordance with this invention, adapted to couple a pair of tubes that are secured to ferrules; and, FIG. 11 shows a cross-sectional view of an adaptation of the embodiment of FIG. 10 through which a tube that is secured to a ferrule is fastened in a tapped hole in a body.

DETAILED DESCRIPTION OF INVENTION

In the description that follows FIGS. 1 through 4 are employed to describe the seat insert and the latching attachment mechanism of this invention and its utility in a conduit union system. FIGS. 5 through 11 are employed to demonstrate the adaptability of this invention to flange securing and sealing face methods other than that shown in FIG. 1. In all figures, parts having the same function are identified by the same numeral.

The flared tube union illustrated in FIG. 1 comprises nut body 1, seat insert 2, bored screw 3 and flared tubes 4 and 4a. Seat insert 2 is provided with equal diameter cylindrical lands 5 and 5a, coaxial conical ends 6 and 6a and cylindrical groove 7 that is substantially at the mid point. The cone angles of conical end 6, of the flared end 8 of tube 4 and of conical shoulder 9 in screw 3 are substantially equal. Similarly, the cone angles of conical end 6a, of the flared end 10 of tube 4a and of the conical shoulder 11 in nut body 1 are substantially equal. The cone angles of the two sets of mating cones may be but are not necessarily equal. Bore 12 in screw 3 mates with tube 4; bore 13 in nut body 1 mates with tube 4a; and bore 14 in seat insert 2 provides the communicating passage between tubes 4 and 4a. The two sets of mating cones are simultaneously clamped into sealing contact by the screw motion of screw 2 into nut body 1.

Tubular portion 15 is integral with and projects coaxially from screw 3. The outer diameter of tube 15 is equal to or smaller than the root diameter of the threads of screw 3 and the bore 16 is slightly larger than the diameter of lands 5 and 5a. The wall of tube 15 is provided with a pair of diametrially opposite indentations 17 and 17a. The diametral distance between innermost points of indentations 17 and 17a is smaller than the diameter of lands 5 and 5a, but is greater than the diameter of groove 7. The diameter of the indentations 17 and 17a is less than the width of groove 7. Accordingly seat insert 2 is permitted to move axially and laterally within this attachment for clamping alignment, but remains attached to screw 3 upon disconnection of screw 3 from nut body 1. FIG. 2 illustrates the engagement of the indentations 17 and 17a as viewed in a lateral plane in groove 7 and identified by section I—I in FIG. 1. During insertion into or removal of seat insert 2 from bore 16 through the application of an axial force between seat insert 2 and screw 3 tube 15 elastically deforms into oval shape, as illustrated in FIG. 3, when the indentations 17 and 17a contact land 5. The oval deformation is permitted by the clearance between bore 16 and land 5 as shown in FIGS. 2 and 3.

The required oval deformation of tube 15 combined with circumferential elongation can be achieved within the yield stress of relatively low strength materials such as screw machine brass, aluminum and steel; and the latching action through spring back is therefore completely effective with such materials. The latching method of this invention is readily produced within economically achievable production tolerances.

The utilization of bored screw 3 of FIG. 1 to fasten a flared tube in a tapped hole in a body is shown in FIG. 4. In FIG. 4, the tapped hole 18 in body 19 is provided with a commonly used drill angle shoulder 20. The cone angle of this shoulder is characteristicly greater than practical tube flare angles. For this reason the cone angle of end 6a of seat insert 2 in FIG. 4 is greater than the cone angle of end 6. Flange 21, which is formed through the extension of cone 6a beyond the diameter of land 5a, is larger in diameter than bore 16 and thereby functions to prevent the accidental reverse insertion of seat insert 2. Annular ridges 22 are provided on cone 6a to assist fluid tight seating on the possibly rough surface of the drill-formed shoulder 20. Bore 14 communicates tube 4 with passage 23 in body 19.

When the conical tube end is provided by securing a flanged end piece to the tube end the elements of the union of this invention may be arranged as shown in FIG. 5. In FIG. 5, tube 4 is secured to flanged end 23 and tube 4a is secured to flanged end 24. The cone angles of conical face 25 in flanged end 23 and of conical end 6 of seat insert 2 are substantially equal; similarly, the cone angles of conical face 26 of flanged end 24 and of conical end 6a of seat insert 2 are substantially equal. Shoulder 27 in nut body 1 mates with flange 28 of end 24 and shoulder 29 of bored screw 3 mates with flange 30 of end 23 to provide the means through which the thread action between screw 3 and nut body 1 forces the mating cones of members 2, 23 and 24 into sealing contact. In the configuration of FIG. 5, the tubular portion 15 is integral with and projects coaxially from flanged end 24; and the ends 23 and 24 may be interchanged between nut body 1 and bored screw 3.

The elements of the configuration of FIG. 5 can be utilized to fasten a tube having a secured flanged end to a tapped hole as illustrated in FIG. 6.

The method of securing tubes to flanged ends indicated in FIGS. 5 and 6 is brazing; however, it will be understood by those skilled in the art that other methods such as welding, threading or swaging may also be used.

In FIG. 7, the bored screw 3 is adapted to accomodate seat inserts requiring a flat seating face. Accordingly, the embodiment includes a flanged end 23 which is provided with a flat face 31 and a tubular portion that projects from screw 3 as in FIG. 1. The seat insert 2 shown in FIG. 8 is of a form adapted to seal against a flat face. The seat insert 2 of FIG. 8 is provided with grooves 32 and 32a to provide conical ends 6 and 6a with a bellville like flexibility. The seat insert 2 shown in FIG. 9 is provided with annular grooves 33 and 33a in end faces 34 and 34a respectively; and grooves 33 and 33a are adapted to receive 0 rings or gaskets 35 and 35a respectively.

The embodiments of FIGS. 5, 6 and 7 illustrate that, in the case of secured flanged end configurations, the tubular portion of the latching mechanism may be made integral with either the flanged ends or the bored screw. The selection may be made on the basis of minimum material use in production.

In the embodiment shown in FIG. 10 the union of this invention is adapted to couple a pair of ferrule ended tubes. Ferrules 36 are secured to tubes 4 and 4a. Each ferrule 36 is provided with a convex, conical seating surface 37 and seat insert 2 is provided with mating concave, conical end faces 38. End faces 38 converge into bores 39. Tubes 4 and 4a slide into bores 39 but the inward axial travel is limited by shoulders 40 at the junction of bores 39 and bore 14.

The modification of members 2 and 3 to accept a ferrule ended tube and to fasten the tube in a tapped hole in a body is illustrated in FIG. 11. In this embodiment, the seat insert 2 is provided with a convex conical end 41 that mates with the conical bottom 20 of tapped hole 18. A flange 21 as shown in FIG. 4 may be omitted because assembly is not possible with an inverted seat insert in this embodiment.

What is claimed is:

1. The means for fastening a conduit having a flanged end in a fluid tight assembly comprising: said flanged end, a seat member, a first coupling member and a second coupling member; said seat member having coaxial end faces, one of said end faces mating in sealing relationship with the seal face of said flanged end, said first coupling member being adapted to engage said flanged end and said coupling members being mutually adapted to clamp said seat member against said sealing face of said flanged end:

a. said seat member being a cylinder coaxial with the axis of said end faces, said cylinder having a coaxial cylindrical groove spaced between said end faces by cylindrical lands;

b. said first coupling member being a screw member, said screw member having a coaxial tubular portion extending forward of the threads of said member, the bore of said tubular portion extending in said screw member and joining a smaller coaxial bore therin, the shoulder formed at the junction of said bores being adapted to engage said flanged end, a pair of diametrally opposite inward indentations being in the wall of said tubular portion, said indentations projecting into said cylindrical groove in said seat member to attach said seat member to said screw member;

c. the diametral distance between the innermost points of said indentations being less than the diameter of said lands but greater than the diameter of said groove, the diametral clearance between said lands and said bore of said tubular portion being sufficient to allow said tubular portion to ovalize when said indentations engage said lands thereby permitting the insertion of said seat member into said bore through the application of an axial force between said seat member and the screw member, the width of said groove being greater than the width of said indentations, lateral and axial play being thereby provided in said attachment; and, d. said second coupling member being a body having a threaded bore that mates with said screw member and having an internal shoulder that mates in sealing relationship with the second of said end faces of said seat member.

2. In the system of claim 1, said flanged end being a ferrule, said ferrule being adapted to grip said conduit to form a flange thereby, and said seat member being adapted at said first mentioned end face to provide radial compression of said ferrule under the clamping action of said coupling members.

3. In the system of claim 1, the fastening end of said conduit being flared, said flanged end being thereby provided.

* * * * *